March 19, 1946.        L. A. TROFIMOV        2,397,062
POWER APPARATUS FOR DRIVING A LOAD AT VARIABLE SPEED
Filed Oct. 2, 1942
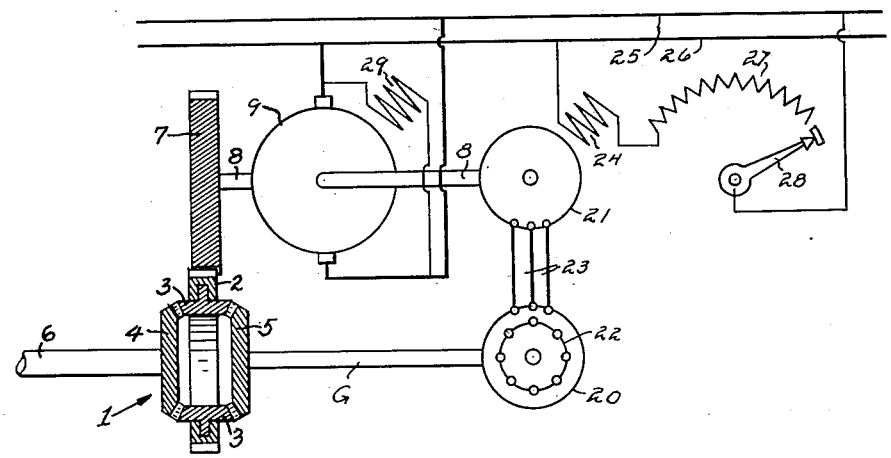
Inventor
Lev A. Trofimov
By Harry P. Canfield
Attorney Patented Mar. 19, 1946

2,397,062

UNITED STATES PATENT OFFICE 2,397,062

POWER APPARATUS FOR DRIVING LOADS AT VARIABLE SPEEDS

Lev A. Trofimov, Willoughby, Ohio

Application October 2, 1942, Serial No. 460,510

4 Claims. (Cl. 172—239)

This invention relates to apparatus for applying the power of a motor to a load to move it and control its speed or to bring it to rest.

In the case of inertia loads or overhauling loads such for example as hoist loads which are brought to rest by motor power, the invention is applicable to the control of the speed of the load in both the forward and reverse directions.

As will be apparent hereinafter, the invention may be practiced with any class of power supplying motor: electric, internal combustion, etc.

In general the invention comprises among other things, a differential gearing, one element of the gearing being continuously driven preferably at constant speed by the power supplying motor which preferably runs continuously; another element of the gearing being connected to the load to be driven and whose speed is to be controlled; and improved means for controlling the speed of a third element of the gearing to control the speed, or both the speed and direction, of the load.

Considered apart from the power source motor, the invention may be considered as an improved power transmission. Considered with the power source motor, the invention may be considered as a power supplying and controlling apparatus.

It is among the objects of the invention:

To provide generally improved means for variably applying the power of a motor to a driven load.

To provide improved apparatus by which the power of a continuously running motor may be applied to a load and by which the speed, or the speed and direction, of the load may be controlled.

To provide an improved differential gearing type of power transmission.

To provide improved means for controlling the transmission of power through a differential gearing transmission.

To provide an apparatus by which the power of a motor may be applied to drive a load at variable speed but at substantially constant horsepower at all speeds.

To provide an apparatus by which the power of a motor may be applied to drive a load of the inertia type and at multiplied torque when the load is at rest or moving at low speeds.

Other objects will be apparent to those skilled in the art to which my invention appertains. My invention is fully disclosed in the following description taken in connection with the accompanying drawing in which the single figure is a diagrammatic view illustrating an embodiment of my invention.

Referring to the drawing I have shown generally at 1 a differential gearing comprising a spider element 2 rotatably supported pinions 3—3 meshed with differential gears 4 and 5. A load driving shaft 6 is connected to the differential gear 4. A shaft G is connected to the differential gear 5. The load to be driven by the shaft 6 has been omitted to simplify the drawing and it may be any kind of a load the speed of which is to be controlled as described herein.

The spider 2 is rotatably driven by a pinion 7 on the shaft 8 of a power supplying motor 9, which as shown diagrammatically, is a direct current motor, having a shunt field winding 29, and connected across direct current supply mains 25, 26; and such a motor as is well known will run substantially at constant speed.

As will become apparent hereinafter, it is preferable for the motor 9 to drive the shaft 8 continuously and at constant speed, but constancy of speed here is not an essential part of the present invention; and while the motor 9 is shown connected directly across the supply mains 25, 26 and therefore continuously running it will be understood that it may be started and stopped by any suitable or well known means as will be clear to those skilled in this art.

Connected to the shaft G and driven thereby, is an induction generator 20 having the physical construction characteristics of a squirrel cage induction motor; and at 21 is a motor unit having the physical construction characteristic of a synchronous alternating current motor, including a direct current field element 24. The motor 21 as will be described acts both as a motor, and as an exciter for the generator 20, and may be referred to generally as an electro-dynamic unit.

The rotor 22 of the generator 20 is driven by the shaft G; the stator winding of the generator 20 is connected by wires 23 to the alternating current winding of the motor 21; the direct current field winding 24 of the motor 21 is energized across the direct current supply mains 25 and 26, through a resistor 27 under the control of a rheostat arm 28. Electrical power developed by the generator 20 drives the unit 21 as a motor, at which the generator power is converted into mechanical power and applied to the shaft 8.

With the arrangement illustrated, the torque supplied by the power supplying motor 9 to the spider 2 divides at the spider and is transmitted equally to the load shaft 6 and the shaft G tending to drive them both in the same direction. With the field rheostat 24 of the motor 21 adjusted so that the generator 20 develops little or no electrical load, and requires little torque to drive it, as will be more fully explained, and with at least an appreciable load on the shaft 6, the differential gear 5 and the shaft G will be driven at twice the speed of the spider 2, and the differential gear 4 and load shaft 6 will remain at rest. If now the rheostat arm 28 be moved to cut out some of the resistance of the resistor 27 to develop electrical load on the generator 20, as will be explained the increased torque to drive the generator will cause the differential gear 5 to slow down and the same amount of torque will be applied to the differential gear 4 and speed it up thereby driving the load shaft 6. The greater the load thus developed at the generator 20, the faster will the load shaft 6 turn up to a maximum speed of the load shaft determined by the maximum load of the generator 20.

In this manner the speed of the load shaft can be varied from zero speed to maximum speed in the forward direction by changing the load of the generator 20 from minimum to maximum respectively.

The mechanical power diverted to drive the generator 20 is supplied back to the spider 2 and therefore is not consumed or lost. This is done by supplying this power to the main motor shaft 8 by the motor 21 energized from the generator and therefore the motor 21 supplements the power of the motor 9 in driving the spider.

The load developed by the generator 20 and supplied to the motor 20, and therefore likewise the power developed by the motor 20, may be made maximum when the load shaft is at rest by adjusting the generator load to maximum, as will be understood from the foregoing description, and thus the full horsepower of the motor 9 at high torque may be applied to the load shaft 6 even if the load shaft be at rest.

As the load shaft 6 accelerates and speeds up, the generator 20 slows down, and the power developed by the generator 20 and applied through the motor 21 diminishes; but the full power of the motor 9 continues to be applied to the load driving it at higher speed and at lower torque but again at full horsepower.

In this connection it will be observed that since the torque at the differential gears 4 and 5 is at all times equal, and the torque at the differential gear 5 being high when the generator 20 is driven at high speed and smaller when its speed becomes less, the torque at the differential gear 4 and load shaft 6 will be high torque when the load shaft is at rest, or moving slowly, and lesser torque when it is moving at high speed.

It follows that a motor 9 which has a sufficiently high rated horsepower to drive the load after it has attained its maximum speed, will be able to start and accelerate the load very quickly even if it be a heavy inertia load, because the full rated horsepower of the motor is applied to the load even if it be at rest.

The apparatus or transmission is thus a substantially constant horsepower, variable speed outfit.

The principles underlying the operation of the generator 20 and motor 21 by which the motor is driven by current supplied by the generator will now be described.

It is well known that if a squirrel cage induction motor has its stator energized with polyphase alternating current to produce a rotary magnetic field therein, and if the squirrel cage rotor be driven at a speed above the speed of rotation of the magnetic field, alternating current will be generated in the field and supplied back over the polyphase mains by which the stator is energized or excited.

The unit 21 at all times is constrained to rotate at the speed of the shaft 8, and, when its field 24 is energized, it will act as an exciting generator and supply exciting current through the wires 23 to the generator 20, producing a rotary magnetic field therein. The frequency of the alternations of the current in the mains 23 will be determined by the speed of the shaft 8 and the number of poles of the unit 21 acting as a generator, and the speed at which the magnetic field revolves in the unit 20 will be determined by this frequency and by the number of poles of its stator winding. Preferably the speed of rotation of the magnetic field of the generator 20 is made such that when the load shaft 6 is at rest and the shaft G is revolving at maximum speed, the rotor 22 of the generator 20 will be driven at twice the number of revolutions per minute as that of the rotary magnetic field, whereby it will generate a great value of current in the wires 23 and supply it back to the unit 21. This current reacting upon the direct current field of the unit 21 drives the unit 21 as a motor and the power thereof is applied to the shaft 8 supplementing that of the motor 9.

The control of the speed of the load shaft is controlled by controlling the energization of the field winding 24 of the unit 21 by moving the rheostat arm 28. The amount of current or load developed at the generator 20 will be in accordance with the value of exciting current supplied to it by the unit 21, and this in turn is predetermined by the strength of the field 24 as determined by the position of the arm 28 with respect to the resistor 27. Either the direct current element or the alternating current element of the unit 21 may be the rotor thereof.

As mentioned heretofore, the main power source motor 9 may be any class of motor, including an alternating current electric motor.

In the drawing, I have illustrated for the differential gearing, one of the type comprising bevel differential gears and bevel pinions; but it will be clear to those skilled in the art that the invention may be practiced with the so-called planetary type of differential gearing; and while I have shown the differential gears 4 and 5 as of the same diameter it will be understood that they may be of different diameters.

In the drawing I have shown the generator as connected directly to the differential gear 5, but it will be understood that it may be connected thereto by gears having any suitable gear ratio; and I have shown the pinion 7 as driving the spider at a one-to-one ratio; but this ratio may be other than one-to-one as will be understood. It is preferable that in general the generator be driven at such speed, relative to the speed at which the supplemental motor 21 is caused to run by its connection with the spider that the supplemental motor 21 will always be operated as a motor and not as a generator.

My invention therefore may be practiced with forms and modifications other than those illustrated and described above or with changes therein and my invention comprehends all such modifications and changes which come within the scope of the appended claims.

I claim:

1. In an apparatus for supplying power to drive a load at variable speed; a differential gearing comprising a spider element rotatably supporting a pinion, and comprising two differential gears both meshed with the pinion; a continuously running main motor continuously driving the spider element; a load driving element driven by one differential gear; an alternating current induction generator driven by the other differential gear; an electro-dynamic unit comprising a stator and a rotor one of which is an alternating current element and the other of which is a direct current element; the rotor being mechanically associated with the main motor so as to rotate at a speed proportional to that of the main motor; the alternating current element being supplied with electrical power from the output of the alternating current generator, and the rotor being driven thereby and the alternating current element supplying energizing current to the induction generator at frequency determined by the speed of the main motor; and means to vary the electrical load of the generator.

2. In an apparatus for supplying power to drive a load at variable speed; a differential gearing comprising a spider element rotatably supporting a pinion, and comprising two differential gears both meshed with the pinion; a continuously running main motor continuously driving a spider element; a load driving element driven by one differential gear; an alternating current induction generator driven by the other differential gear; an electro-dynamic unit comprising a stator and a rotor one of which is an alternating current element and the other of which is a direct current element; the motor being mechanically associated with the main motor so as to rotate at a speed proportional to that of the main motor; the alternating current element being supplied with electrical power from the output of the alternating current generator, and the rotor being driven thereby, and the alternating current element supplying energizing current to the induction generator at frequency determined by the speed of the main motor; and means to vary the electric power supplied to the electro-dynamic unit.

3. In an apparatus for supplying power to drive a load at variable speed; a differential gearing comprising a spider element rotatably supporting a pinion, and comprising two differential gears both meshed with the pinion; a continuously running main motor continuously driving the spider element; a load driving element driven by one differential gear; an alternating current generator having the physical characteristics of a squirrel cage induction motor and having a squirrel cage rotor driven by the other differential gear; an electro-dynamic unit having the physical characteristics of an alternating current synchronous motor and the rotor thereof being connected to rotate at a speed proportional to that of the main motor; the alternating current element of the synchronous motor being electrically connected to the stator of the generator and supplying energizing current to it at a frequency determined by the speed of the main motor, and also receiving electrical output power from the generator at that frequency; and means to vary the electrical load of the generator.

4. In an apparatus for supplying power to drive a load at variable speed; a differential gearing comprising a spider element rotatably supporting a pinion, and comprising two differential gears both meshed with the pinion; a continuously running main motor continuously driving the spider element; a load driving element driven by one differential gear; an alternating current generator having the physical characteristics of a squirrel cage induction motor and having a squirrel cage rotor driven by the other differential gear; an electro-dynamic unit having the physical characteristics of an alternating current synchronous motor and the rotor thereof being connected to rotate at a speed proportional to that of the main motor; the alternating current element of the synchronous motor being electrically connected to the stator of the generator and supplying energizing current to it at a frequency determined by the speed of the main motor, and also receiving electrical output power from the generator at that frequency; and means to vary the electrical power supplied by the generator to the synchronous motor.

LEV A. TROFIMOV.